United States Patent
Bharrat et al.

(10) Patent No.: US 11,909,912 B2
(45) Date of Patent: Feb. 20, 2024

(54) METHODS AND APPARATUS FOR CALL TRAFFIC ANOMALY MITIGATION

(71) Applicant: Ribbon Communications Operating Company, Inc., Plano, TX (US)

(72) Inventors: Shaun J. Bharrat, Edison, NJ (US); John W. Hutchins, Groton, MA (US)

(73) Assignee: Ribbon Communications Operating Company, Inc., Plano, TX (US)

( * ) Notice: Subject to any disclaimer, the term of this patent is extended or adjusted under 35 U.S.C. 154(b) by 171 days.

(21) Appl. No.: 17/510,589

(22) Filed: Oct. 26, 2021

(65) Prior Publication Data

US 2023/0131229 A1  Apr. 27, 2023

(51) Int. Cl.
*H04M 3/436* (2006.01)

(52) U.S. Cl.
CPC ................... *H04M 3/436* (2013.01)

(58) Field of Classification Search
None
See application file for complete search history.

(56) References Cited

U.S. PATENT DOCUMENTS

| | | | |
|---|---|---|---|
| 10,659,485 B2 | 5/2020 | Bharrat et al. | |
| 10,666,798 B2 | 5/2020 | Bharrat et al. | |
| 10,931,696 B2 | 2/2021 | Kuppanna et al. | |
| 10,944,776 B2 | 3/2021 | Bharrat et al. | |
| 2005/0259667 A1* | 11/2005 | Vinokurov | H04M 3/2281 379/112.03 |
| 2009/0202057 A1* | 8/2009 | Tartarelli | H04M 3/436 379/142.04 |
| 2009/0202061 A1* | 8/2009 | Charzinski | H04M 3/436 379/210.02 |
| 2015/0334231 A1 | 11/2015 | Rybak et al. | |
| 2020/0412871 A1* | 12/2020 | Quilici | H04M 1/663 |
| 2021/0014355 A1* | 1/2021 | Quilici | H04M 3/42059 |

FOREIGN PATENT DOCUMENTS

CN           10214346 A1   8/2021

OTHER PUBLICATIONS

Search Report from related EP Application 22201647.9 dated Feb. 24, 2023 (9 pages).

* cited by examiner

*Primary Examiner* — Harry S Hong
(74) *Attorney, Agent, or Firm* — Brooks, Cameron & Huebsch, PLLC

(57) ABSTRACT

Methods and apparatus for call traffic anomaly mitigation are described herein. One or more embodiments include receiving a scoring request including a telephone number associated with a telephone call at a scoring device from a call processing entity, receiving a violator list of telephone numbers and their corresponding severity values at the scoring device from an anomaly analyzer, determining a severity value associated with the telephone number by performing a lookup operation in the violator list, performing a random simulation using the severity value as a probability to determine an indicator value, and inputting the indicator value into a model to determine a call reputation score.

20 Claims, 5 Drawing Sheets

METHODS AND APPARATUS FOR CALL TRAFFIC ANOMALY MITIGATION

TECHNICAL FIELD

The present disclosure relates to methods and apparatus for call traffic anomaly mitigation.

BACKGROUND

A variety of systems have been developed to score and potentially block robocalls. In a number of prior concepts, a positive and/or negative telephone list can be used. For example, if a telephone number is on a positive telephone list (often referred to as a whitelist), the call is allowed and if a telephone number is on a negative telephone list (often referred to as a blacklist), the call is blocked. The membership of a telephone number on a list is generally binary. If a number is on the negative list, it is always blocked and if it is on the positive list, it is always allowed.

In other prior concepts, a positive and/or negative telephone list can be used in a scoring model where a telephone number will be given a value based, at least in part, on which telephone list the telephone number is on. Accordingly, a scoring of a call in this manner is deterministic and can be problematic in several respects.

When a telephone number is added to a negative telephone list, all calls associated with that telephone number are blocked and later, when the telephone number is removed from the negative list, all calls associated with that telephone number are allowed through. This cycle of adding and removing a telephone number is often repeated many times. This is called "flapping" and can induce undesirable network effects. This is just one of several problems associated with blocking and/or allowing calls deterministically based on whether or not a telephone number is present on a positive and/or negative telephone list.

DETAILED DESCRIPTION

Figure 1:
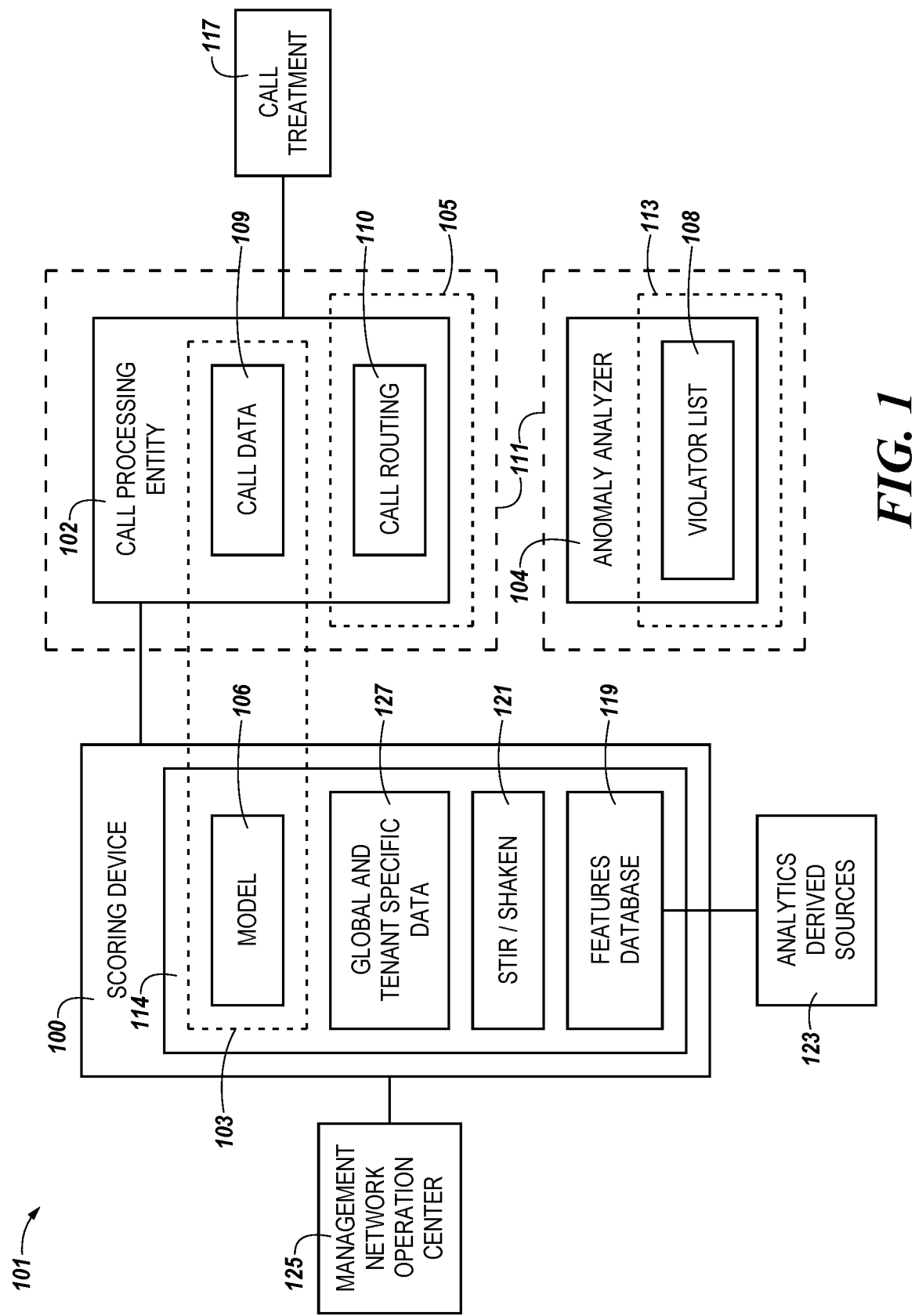
FIG. 1 illustrates an example of a system for call traffic anomaly mitigation according to one or more embodiments of the present disclosure.

In the embodiments of the present disclosure, methods and devices can be used for call traffic anomaly mitigation. One or more embodiments include receiving a scoring request including a telephone number associated with a telephone number associated with a telephone call at a scoring device from a call processing entity, receiving a violator list of telephone numbers and their corresponding severity values at the scoring device from an anomaly analyzer, determining a severity value associated with the telephone number by performing a lookup operation in the violator list, performing a random simulation using the severity value as a probability to determine an indicator value, and inputting the indicator value into a model to determine a call reputation score.

Routing calls at least partially based on a call reputation score can enable throttling, improve downstream analytics, and/or enable blocking of telephone calls before they are near certainly known to need blocking. The present disclosure enables dynamic throttling by increasing a probability of a call being blocked as a severity value associated with a calling telephone number increases and/or decreasing the probability of the call being blocked as the severity value associated with the calling telephone number decreases. One benefit of dynamic throttling is that timeouts, previously used to determine when to remove a telephone number from a negative list, are no longer necessary with throttling. This feature, for example, removes some of the arbitrariness of the blocking of call numbers in previous systems.

In some circumstances under prior concepts, a telephone number no longer used by a robocalling service or a telephone number that was improperly determined to be a robocaller may have been blocked needlessly. Accordingly, allowing some calls to go through by performing a random simulation on the severity value as a probability to determine an indicator value, determining the call reputation score based on the indicator value, among other model features, and determining whether to block the call based on the call reputation score can be useful for downstream analytics. For example, allowing some calls to reach a terminating subscriber allows a carrier's solution to query the subscriber about whether the call was a nuisance robocaller. In previous approaches, a call associated with a telephone number included on a negative telephone list would be outright blocked causing blackouts in downstream analytics, thereby not allowing confirmation that a call was a robocall. In a number of embodiments of the present disclosure, a telephone number can be added to a negative list before it is near certainly known to need blocking, unlike currently available solutions. This can provide a benefit to some users by preventing them from receiving robocalls that would ordinarily be passed through to them.

Devices and methods of the present disclosure can also have benefits over methods and devices utilizing neural network approaches. Neural network approaches can allow machine discovery of hidden patterns using labeled call data. However, once trained, neural networks are still deterministic. For example, given a set of feature inputs, a result from a neural network will be deterministic.

Unlike prior neural network concepts, embodiments of the present disclosure enable retraining (e.g., tuning) to be split between an on-premises portion and a hosted portion. This eliminates the need to make all training available in the hosted portion. This can reduce latency in performing the operations and allows training to use data which for proprietary or personally identifiable information data considerations is only available in the on-premises environment.

Additionally, unlike prior neural networks, embodiments of the present disclosure allow feature values to be adapted for a telephone number while reusing the same model instead of having to retrain the model. Adapting feature values requires significantly less data for dynamic adaptation than retraining a model, which can be beneficial in some implementations.

The behavior and outputs of prior neural network models can be confusing and unexplainable, while the behavior and outputs of the present disclosure can be understood and explained. For example, a higher severity value in embodiments of the present disclosure results in a higher chance of an elevated call reputation score. This allows a person or another system to verify and validate the outputs from the call traffic anomaly mitigation system, thereby increasing certainty that the system's decision to block calls from a call number is reviewable and confirmable.

Although robocalling is frequently used as an example, the methods and devices described herein can be used for any traffic anomaly. An anomaly, as used herein, can be detected as a difference from historical behavior from a calling telephone number and/or a called telephone number. For example, fraud and telephony denial of service (TDoS) attacks can be traffic anomalies. In a number of embodiments, an anomaly can be detected as a telephone number that is no longer being used by a robocalling service, in response to the telephone number no longer exhibiting a known robocall pattern, for example.

In the following portion of the detailed description, reference is made to the accompanying figures that form a part hereof. The figures show by way of illustration how one or more embodiments of the present disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense. Also, as used herein, "a" or "a number of" something can refer to one or more such things. For example, "a number of operations" can refer to one or more operations.

FIG. 1 illustrates an example of a system 101 for call traffic anomaly mitigation according to one or more embodiments of the present disclosure. The system 101 can include a scoring device 100, a call processing entity 102 (e.g., a centralized policy server), and/or an anomaly analyzer 104. The call processing entity 102 and/or the anomaly analyzer 104 can perform network operations 111.

In a number of embodiments, upon receiving a call routing request, the call processing entity 102 can extract and/or compute call data 109 from the call routing request. The call data 109 can include a calling party telephone number, a called party telephone number, a country code, a trunk group, an Internet protocol (IP) address, a Session Initiation Protocol (SIP) Identity header, a ContextID, and/or a Secure Telephony Identity Revisited (STIR) verification outcome. The call processing entity 102 can transmit a scoring request to the scoring device 100. The scoring request can include at least a portion of the call data 109.

The anomaly analyzer 104 can use calls recorded by the call processing entity 102 in a prior interval to compute key performance indicators (KPIs) associated with anomaly detection. This interval (e.g., time period) can be the same as an execution interval, for example, every 5 or 10 minutes or a longer interval, for example, every hour or every day. The KPIs can depend on the variant of the anomaly analyzer 104 and can be determined on a per telephone number and/or ContextID basis. In some examples, the KPIs can, for instance, be computed per calling party telephone number, calling party telephone number prefix, calling party group, called party telephone number, called party telephone number prefix, called party group, ingress trunk group, egress trunk group, country code, ingress IP address, ingress IP network, egress IP address, egress IP network, call type carrier code, and/or subscriber number group.

The anomaly analyzer 104 can determine, based, for example, on a prior model derived from historical data for each calling party telephone number, calling party telephone number prefix, calling party group, called party telephone number, called party telephone number prefix, called party group, ingress trunk group, egress trunk group, country code, ingress IP address, ingress IP network, egress IP address, egress IP network, call type, carrier code, and/or subscriber number group whether a calling party telephone number, calling party telephone number prefix, calling party group, called party telephone number, called party telephone number prefix, called party group, ingress trunk group, egress trunk group, country code, ingress IP address, ingress IP network, egress IP address, egress IP network, call type, carrier code, and/or subscriber number group has violated the expected behavior for that time period. For example, the anomaly analyzer 104 can determine whether a KPI value for the telephone number during a particular time period is anomalous or normal using the prior model for the telephone number. The telephone number is violating the expected behavior for that time period if the KPI value for the telephone number during the time period is anomalous.

A KPI can be considered anomalous if it is higher than a threshold above the mean of the prior model or lower than a threshold below the mean of the prior model. The threshold can be fixed or a multiple of a dynamic value, such as the standard deviation. For example, an occurrence can be a five-sigma anomaly if it is more than five standard deviations from the mean. Although a five-sigma anomaly is described herein, those of ordinary skill in the art will appreciate that any way of defining an anomaly can be used.

If the telephone number is violating and is not currently present in the violator list 108, the anomaly analyzer 104 can add the telephone number with an initial severity value to the violator list 108. The initial severity value can be fixed or depend on the extent of the violation. In some examples, the initial severity value can be from 5 to 50.

If the telephone number is violating and is already present in the violator list 108, then the severity value can be increased by a step-up value. The step-up value can be fixed or depend on the extent of the violation. The step-up value can be from 5 to 25, for example. The severity value can be capped at a maximum value. In a number of embodiments, the maximum value can be 100.

If the telephone number is not violating, but is present in the violator list 108, the anomaly analyzer 104 can decrease the severity value by a decay value. The decay value can depend on the anomaly analyzer 104 configuration, but can be from 5 to 25, for example.

In a number of embodiments, the minimum severity value can be zero. When the severity value reaches zero, the telephone number can be removed from the violator list 108. Alternatively, the telephone number can be removed after the severity value is at zero for a particular time period or for a particular number of intervals. Removing a telephone number after the severity value is at zero for a particular time period or for a particular number of intervals can prevent oscillation in the violator list 108 membership when, for example, a telephone number repeatedly goes on and off violating.

The anomaly analyzer 104 can reside on a customer's (e.g., a telephone carrier's) premises. This allows the anomaly analyzer 104 to access data that may be personal data, proprietary data, and/or sensitive data. Having the anomaly analyzer 104 on premises prevents the transmission of large amounts of data and prevents data from being stolen during transmission to a location off premises or by listening to communications on premises. In a number of embodiments, the anomaly analyzer 104 is not in a call path because the device may not have the performance requirements to process calls in real-time.

In some embodiments, the anomaly analyzer 104 can process call routing requests in batches instead of in real-time because the anomaly analyzer 104 is not in the call path. Accordingly, updating the violator list 108 can be a part of batch analytics 113. A batch can be records created within a particular time period and/or a batch can be generated once a particular quantity of records has been created. The particular time period or particular quantity of records can be configurable to allow tuning of the system between responsiveness and cost.

An updated violator list 108 can be transmitted to the scoring device 100 at reporting intervals. Reporting intervals can be the same as the analytics interval, a particular period of time longer than the analytics interval, or a multiple of the analytics interval. In some examples, the reporting intervals can be every 5 or 10 minutes. The anomaly analyzer 104 can build a report of all the telephone numbers that have changed severity value, including ones that now have a severity value of zero. This updated violator list 108 of telephone numbers and their corresponding severity values can be uploaded to the scoring device 100 as a custom robocall list.

The scoring device 100 can include a memory 114 to store a model 106, global and tenant specific data 127, a features database 119, and/or caller identification (ID) authentication technology including STIR and Signature-based Handling of Asserted Information Using toKENs (SHAKEN) 121 functionality to use digital certificates to ensure a calling number is secure.

The scoring device 100 can be, for example, a computing device, a cloud computing device, a server, a desktop computer, and/or a personal laptop. The scoring device 100 can receive the scoring request from the call processing entity 102 and/or the violator list 108 from the anomaly analyzer 104. Because personal data, proprietary data, and/or sensitive data can stay with the anomaly analyzer 104, the scoring device 100 can be located on or off a customer's premises.

The scoring device 100 can construct a key value from the call data 109 included in the scoring operation 103. Then the scoring device 100 can determine the severity value associated with the telephone number by performing a lookup operation in the violator list 108. If the telephone number is not in the violator list 108, the severity value can be determined to be zero.

The severity value can be interpreted as a probability by the scoring device 100. An indicator value can be determined using that probability by random simulation. For example, if the severity value is 70, then the indicator value will be one in roughly 70% of the requests and zero in the rest. However, any random distribution function can be used to convert from the random simulation value to an indicator value. In some examples, a uniform random distribution can be used.

In a number of embodiments, the indicator value can be used as a feature input for a model factor. The scoring device 100 can receive, train, re-train, store, and/or perform operations using a scoring model, for example, model 106. Model 106 can be used in the scoring operation 103. The indicator value along with other model features from a features database 119 can be inputted into model 106 to determine a call reputation score. Analytics derived sources 123 can provide data to the features database 119 to be used directly or indirectly as additional model features.

The call reputation score can be outputted by model 106. Different ranges of call reputation score values can be outputted. For example, the range for call reputation scores can be zero to one. In a number of embodiments, a high call reputation score can indicate a reputable call and a low call reputation score can indicate a disreputable call. In some examples, the call reputation score can range from zero, being a minimal likelihood that the call is a robocall, to 100, being a maximal likelihood that the call is a robocall. The call reputation score along with other output parameters can be transmitted to the call processing entity 102.

The call processing entity 102 can be located on the customer's premises and can be separate from the anomaly analyzer 104 and/or the scoring device 100. The scoring device 100 and/or the call processing entity server 102 can be a part of a call path and therefore the scoring device 100 and/or the call processing entity 102 can have resiliency and performance requirements which may differ from the requirements of the anomaly analyzer 104. In some examples, the call processing entity 102 can perform mandatory processing for a telephone call and therefore can have higher resiliency and performance requirements than the scoring device 100.

In a number of embodiments, the call processing entity 102 can be owned and/or used by multiple telephone carriers. The call reputation score could then be received by a number of call processing entities corresponding to different telephone carriers so that the telephone carriers would all know of a particular robocaller, for example.

The call processing entity 102 can receive the call reputation score and determine the call routing 110 based on the call reputation score. The call routing 110 can, for example, be included in the call processing operation 105. The call processing entity 102 may trigger call treatment 117, which, for example, can allow normal continuation of a call for a call reputation score from zero to 50, route the call to voicemail for a call reputation score from 51 to 79, and block the call for a call reputation score from 80 to 100.

A management network operation center (MNOC) 125 can monitor the scoring device 100. In a number of embodiments, the MNOC 125 can detect performance issues that may affect the service provided by the scoring device 100 and/or perform operations to avoid degraded service and/or improve service of the scoring device 100. For example, the MNOC 125 can replace and/or revise model 106 to improve the system 101 for call traffic anomaly mitigation.

Figure 2:
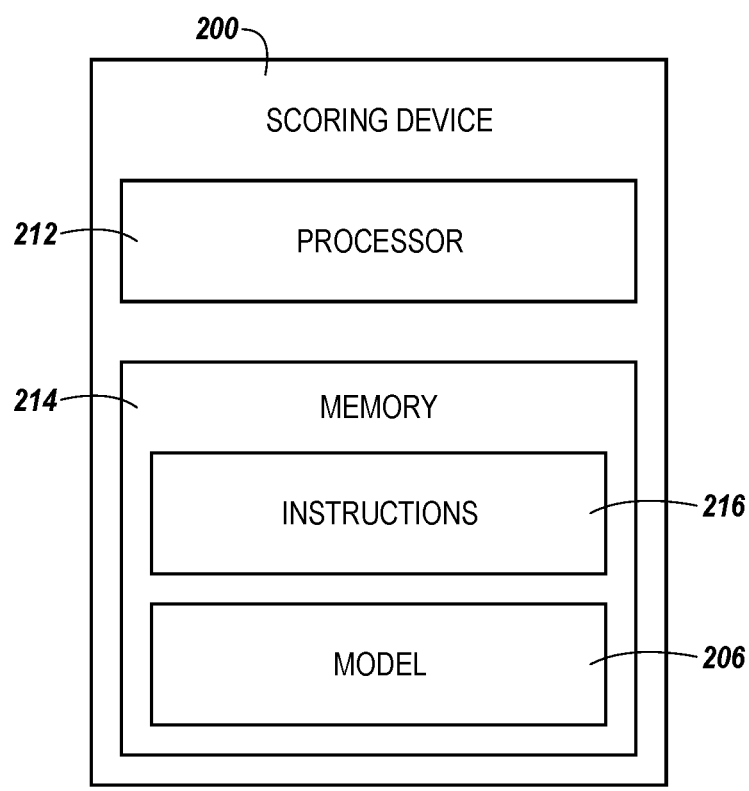
FIG. 2 illustrates an example of a scoring device for call traffic anomaly mitigation according to one or more embodiments of the present disclosure.

FIG. 2 illustrates an example of a scoring device 200 for call traffic anomaly mitigation according to one or more embodiments of the present disclosure. Scoring device 200 can correspond to scoring device 100 of FIG. 1. Scoring device 200 can include a processor 212 and a memory 214, which can correspond to memory 114 in FIG. 1.

The memory 214 can include volatile and/or non-volatile memory. The memory 214 can be coupled to the processor 212 and can store instructions 216 (e.g., computer program instructions) and a model 206, which can correspond to model 106 of FIG. 1. The memory 214 can be any type of storage medium that can be accessed by the processor 212 to perform various examples of the present disclosure. For example, the memory 214 can be a non-transitory computer readable medium having computer readable instructions 216 stored thereon that are executable by the processor 212 to perform functions such as to receive a scoring request including a telephone number associated with a telephone call at the scoring device 200 from a call processing entity (e.g., call processing entity 102 in FIG. 1), receive a violator list (e.g., violator list 108 in FIG. 1) of telephone numbers and their corresponding severity values at the scoring device 200 from an anomaly analyzer (e.g., anomaly analyzer 104 in FIG. 1), determine a severity value associated with the telephone number by performing a lookup operation in the violator list, perform a random simulation using the severity value as a probability to determine an indicator value, and input the indicator value into the model 206 to determine a call reputation score.

The instructions 216 can further include performing the random simulation using a uniform random distribution and the severity value as a threshold value. The call reputation score can be a robocall score representing the likelihood that the telephone call is a robocall and/or the call reputation score can be a fraud score representing the likelihood that the telephone call is a fraudulent call.

The instructions 216 can include determining the severity value associated with the telephone number is zero in response to the telephone number being absent from the violator list or obtaining the severity value associated with the telephone number in response to the telephone number being present on the violator list. The indicator value derived from the severity value can be inputted into the model 206 along with a number of model features to determine the call reputation score. In some examples, the call reputation score can be transmitted to the call processing entity.

In a number of embodiments, the instructions 216 can include receiving an updated violator list of telephone numbers and their corresponding severity values. The telephone numbers and/or severity values of the updated violator list can be different from the telephone numbers and/or severity values of the previous violator list. The updated violator list can be received at periodic intervals and/or after an external call traffic event.

Figure 3:
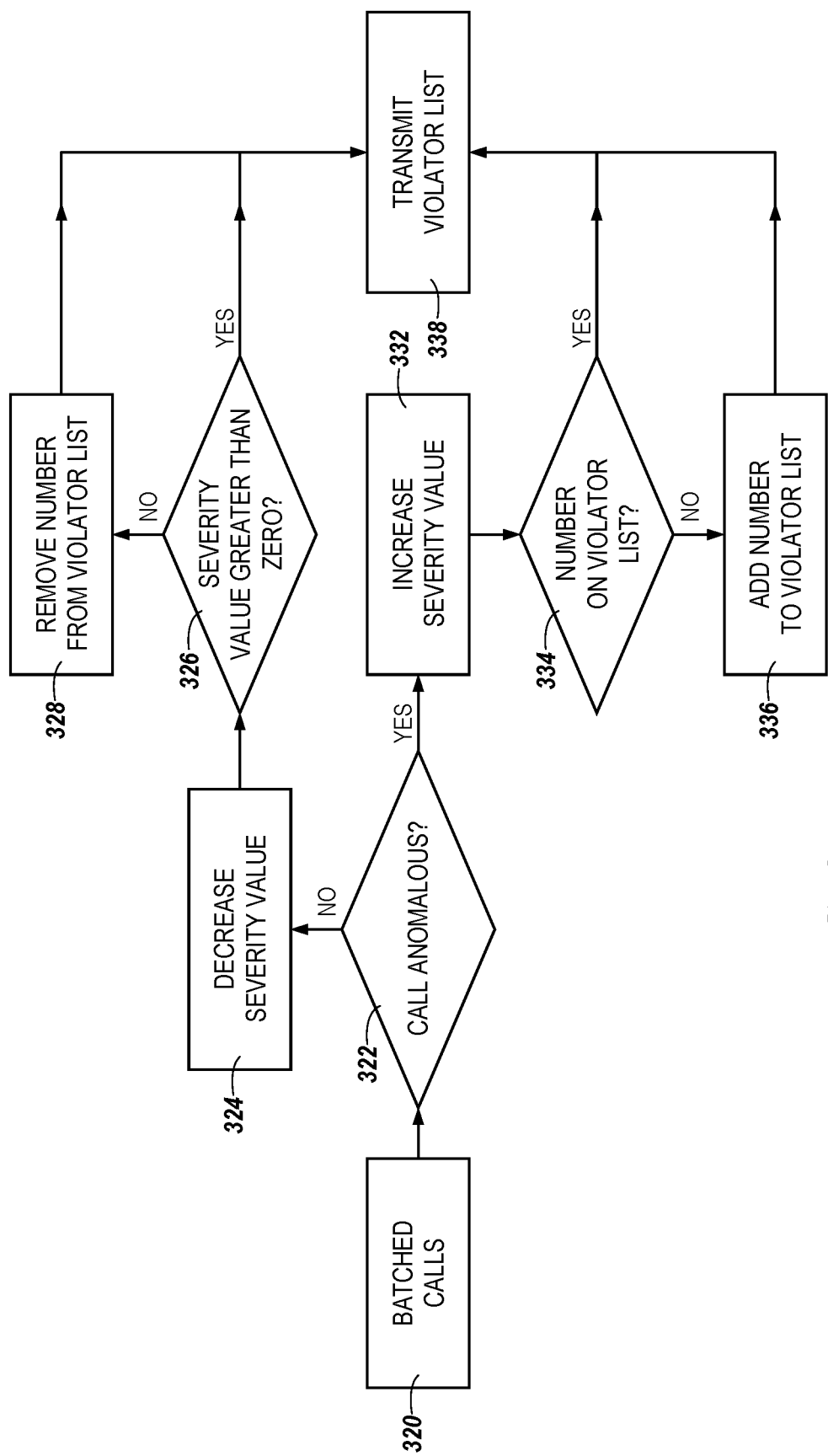
FIG. 3 illustrates an example of a flow diagram for call traffic anomaly mitigation according to one or more embodiments of the present disclosure.

FIG. 3 illustrates an example of a flow diagram for self-tuning call traffic anomaly mitigation according to one or more embodiments of the present disclosure. Batched calls can be received at step 320 by an anomaly analyzer (e.g., anomaly analyzer 104 in FIG. 1).

The anomaly analyzer can determine whether the telephone call is anomalous at step 322. The anomaly analyzer can determine the telephone number is violating the expected behavior for that time period if a KPI value for the telephone number during the time period is anomalous. A KPI can be considered anomalous if it is higher than a threshold above the mean of a prior model or lower than a threshold below the mean of the prior model. If the telephone call is not anomalous, the severity value associated with the telephone number can be decreased by the anomaly analyzer at step 324. The severity value can be decreased by a decay value, which can depend on the anomaly analyzer configuration. The decay value can be, for example, from 5 to 25.

At step 326, the anomaly analyzer can determine whether the severity value is greater than zero. If the severity value is not greater than zero, the telephone number can be removed by the anomaly analyzer from the violator list at step 328. In a number of embodiments, the telephone number can be removed after the severity value is at zero for a particular time period or for a particular number of intervals to prevent oscillation in the violator list membership. If the severity value is greater than zero, the anomaly analyzer can keep the telephone number on the violator list.

If the telephone call is determined to be anomalous at step 322, the severity value associated with the telephone number can be increased by the anomaly analyzer at step 332. The severity value can be increased by a step-up value, which can be fixed or depend on the extent of the violation. In some examples, the step-up value can be from 5 to 25.

At step 334, the anomaly analyzer can determine whether the telephone number is on the violator list. If, the telephone number is not on the violator list, the anomaly analyzer can add the telephone number to the violator list at step 336 and set the severity value to an initial severity value. The initial severity value can be fixed or depend on the extent of the violation. In some examples, the initial severity value can be from 5 to 50. At step 338, the violator list can be transmitted from the anomaly analyzer to a scoring device (e.g., scoring device 100 in FIG. 1).

Figure 4:
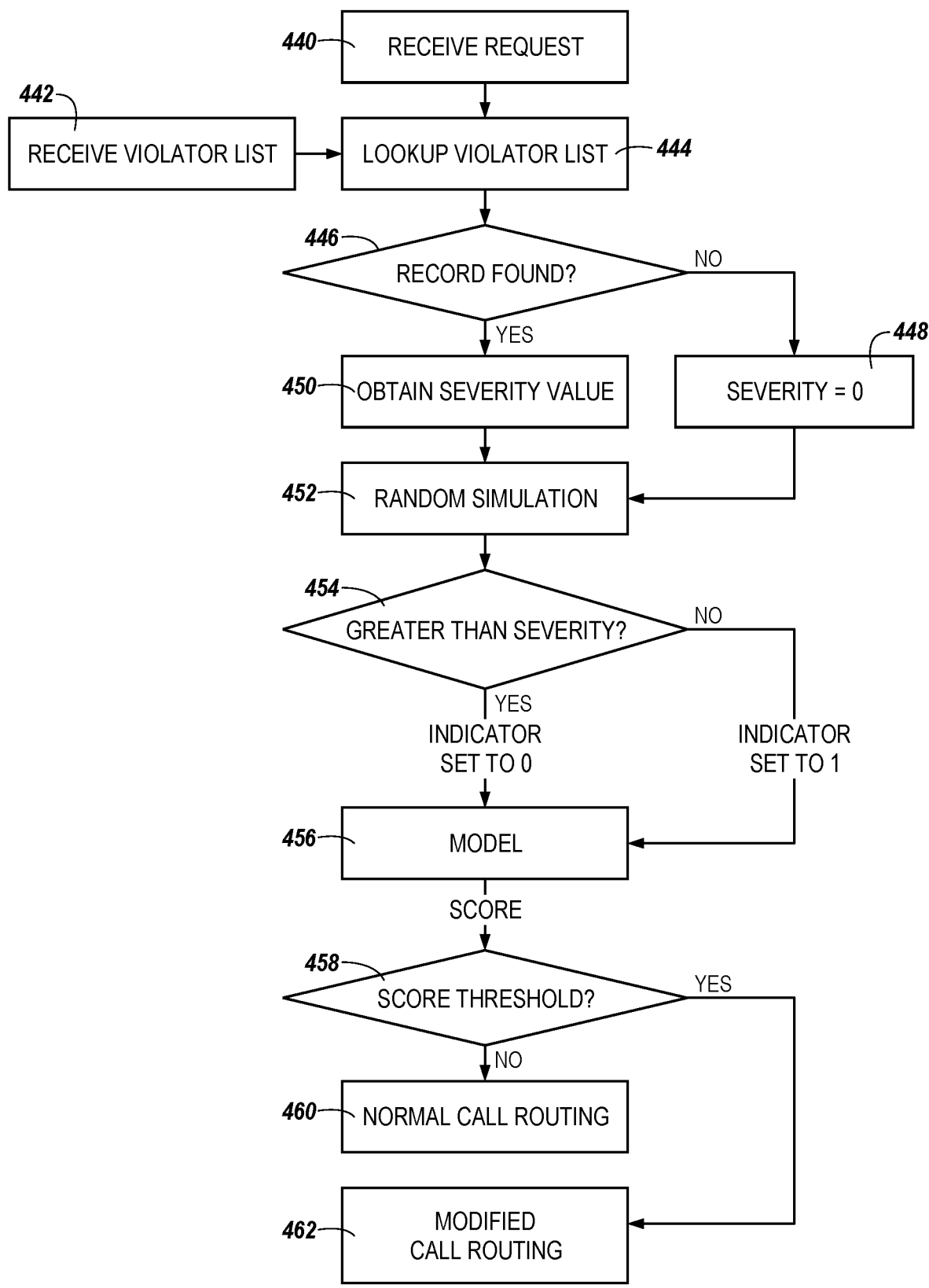
FIG. 4 illustrates an example of a flow diagram for call traffic anomaly mitigation according to one or more embodiments of the present disclosure.

FIG. 4 illustrates an example of a flow diagram for call traffic anomaly mitigation according to one or more embodiments of the present disclosure. At step 440, the scoring device (e.g., scoring device 100 in FIG. 1) can receive a scoring request from a call processing entity (e.g., call processing entity 102 in FIG. 1) and a violator list (e.g., violator list 108 in FIG. 1) from an anomaly analyzer (e.g., anomaly analyzer 104 in FIG. 1) at step 442.

The scoring request can include a telephone number and the violator list can include severity values corresponding to telephone numbers. The scoring device can determine the severity value associated with the telephone number by performing a lookup operation in the violator list at step 444 and determine whether a record of the telephone number and its corresponding severity value is found at step 446. If the telephone number is not in the violator list, the severity value can be determined to be zero at step 448. If the telephone number is in the violator list, the severity value can be obtained at step 450.

The scoring device can use the severity value associated with the telephone number as a probability. At steps 452 and 454, the scoring device can determine a random value by random simulation. In a number of embodiments, a uniform random distribution can be used, but other probability distributions can be used. The indicator value can range from the minimum severity value to the maximum severity value. For example, the minimum severity value can be zero and the maximum severity value can be 100 or the minimum severity value can be zero and the maximum severity value can be one.

At step 454, the scoring device can compare the random value to the severity value to determine if the random value is less than or equal to the severity value. If the random value is less than or equal to the severity value, the scoring device can set the indicator value to one and if the random value is greater than the severity value, the scoring device can set the indicator value to zero.

The indicator value, along with other model features can be inputted into a model (e.g., model 106 in FIG. 1) at step 456 to determine a call reputation score. The call reputation score can be outputted by the model and used for downstream actions. These downstream actions can include transmission to a call processing entity (e.g., call processing entity 102 in FIG. 1). It can also include adding or modifying elements in the response for inclusion in signaling.

The call processing entity can determine whether the call reputation score exceeds a call reputation score threshold at step 458. The call reputation score threshold can be configurable. For example, if the minimum reputation score value is zero and the maximum call reputation score value is 100, the call reputation score threshold may be set to 80. If the call reputation score exceeds the threshold, the call routing can be modified at step 462. Modified call routing can include blocking the call, modifying a display name, routing the telephone call to voicemail, routing the telephone call to a voice challenge, and/or routing the telephone call to an announcement server.

If, the call reputation score does not exceed the threshold, the call can be normally routed at step 460. In the example illustrated in FIG. 4, the call reputation score can range from zero, being a minimal likelihood that the call is a robocall, to 100, being a maximal likelihood that the call is a robocall. However, in a number of embodiments, a high call reputation score could indicate a reputable call and a low call reputation score could indicate a disreputable call. Accordingly, a call reputation score exceeding a threshold could be routed normally and a call reputation score at or below the threshold could be blocked.

Figure 5:
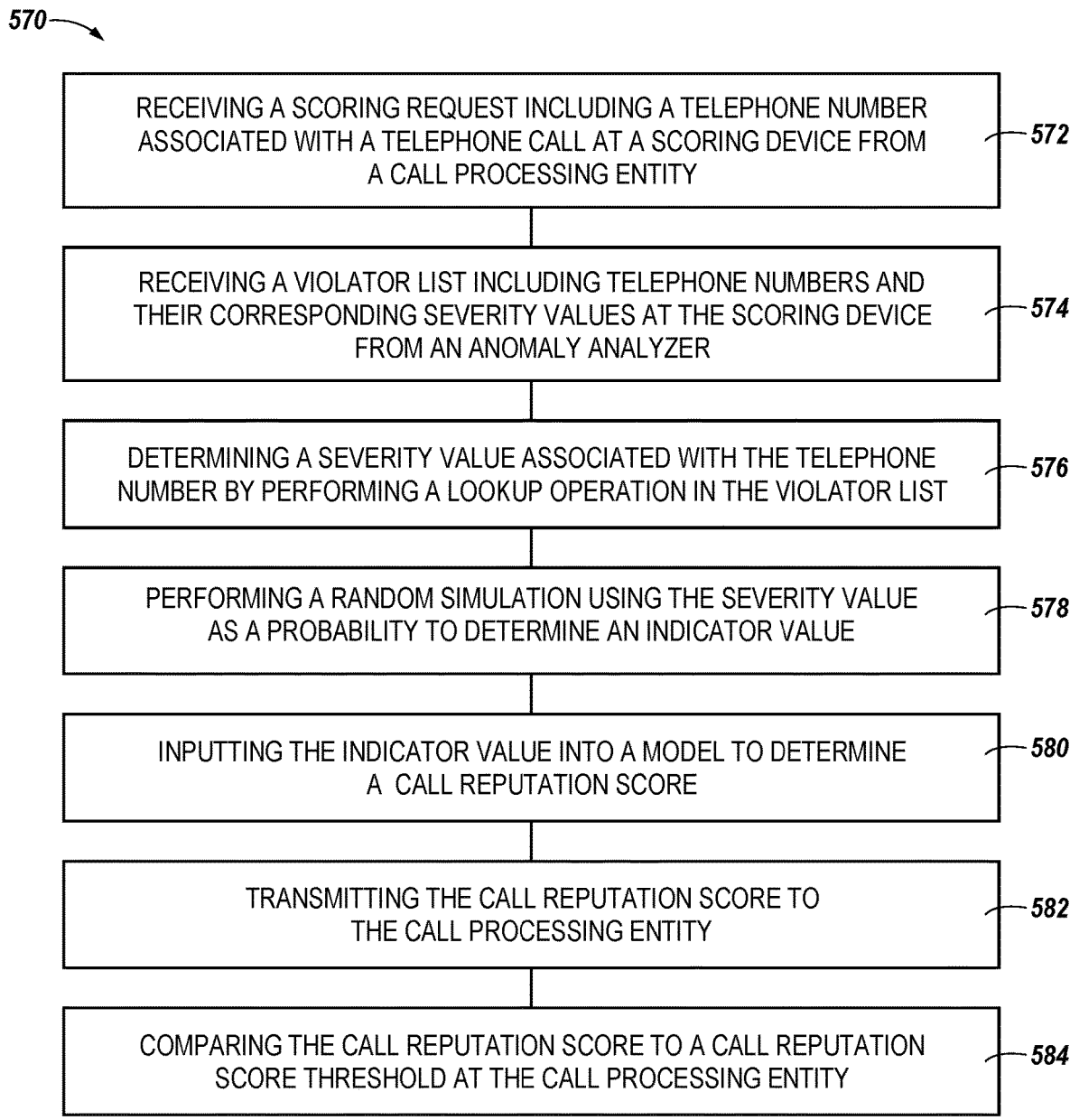
FIG. 5 is a flow diagram of a method for call traffic anomaly mitigation according to one or more embodiments of the present disclosure.

FIG. 5 is a flow diagram of a method 570 for call traffic anomaly mitigation according to one or more embodiments of the present disclosure. At block 572, the method 570 can include receiving a scoring request including a telephone number associated with a telephone call at a scoring device (e.g., scoring device 200 in FIG. 2) from a call processing entity (e.g., call processing entity 102 in FIG. 1). The scoring device can be a computing device, a cloud computing device, a server, a desktop computer, and/or a personal laptop that can be located on or off a customer's premises.

At block 574, the method 570 can include receiving a violator list including telephone numbers and their corresponding severity values at the scoring device from an anomaly analyzer (e.g., anomaly analyzer 104 in FIG. 1). The anomaly analyzer can reside on a customer's premises so that the anomaly analyzer can access data that may be sensitive to determine severity values associated with telephone numbers.

At block 576, the method 570 can include determining a severity value associated with the telephone number by performing a lookup operation in the violator list (e.g., violator list 108 in FIG. 1). For example, the scoring device can search for the telephone number on the violator list.

At block 578, the method 570 can include performing a random simulation using the severity value as a probability to determine an indicator value. In a number of embodiments, a uniform random distribution can be used to determine the indicator value, but other probability distributions can be used as well.

At block 580, the method 570 can include inputting the indicator value into a model (e.g., model 106 in FIG. 1) to determine a call reputation score. Other model features from a features database (e.g., features database 119 in FIG. 1) can also be inputted into the model to determine the call reputation score. In some examples, analytics derived sources (e.g., analytics derived sources 123 in FIG. 1) can provide data to the features database to be directly or indirectly used as additional model features.

At block 582, the method 570 can include transmitting the call reputation score to the call processing entity. The call processing entity can be located on the customer's premises and can be separate from the anomaly analyzer and/or the scoring device. The call processing entity can be a part of a call path and therefore can have resiliency and performance requirements which may differ from the requirements of the anomaly analyzer, for example.

At block 584, the method 570 can include comparing the call reputation score to a call reputation score threshold at the call processing entity. If the call reputation score is equal to or less than the call reputation score threshold, the telephone call can be normally routed. In some examples, a subscriber can be queried to determine whether the telephone number was an undesired call after the telephone call was normally routed.

If the call reputation score is greater than the call reputation score threshold, the telephone call routing can be modified. Modifying the routing of the telephone call can include blocking the telephone call, modifying a name displayed in response to the telephone call, routing the telephone call to a voicemail, and/or routing the telephone call to an announcement server.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A non-transitory computer readable medium having instructions thereon that are executable by a processor for call traffic anomaly mitigation, comprising:
    receiving a scoring request including a telephone number associated with a telephone call at a scoring device from a call processing entity;
    receiving a violator list of telephone numbers and their corresponding severity values at the scoring device from an anomaly analyzer device;
    determining a severity value associated with the telephone number by performing a lookup operation in the violator list;
    performing a random simulation, by the scoring device, using the severity value, interpreted as a probability, as an input to determine an indicator value;
    the scoring device inputting the indicator value into a model derived from historical data to determine a call reputation score; and
    the call processing entity triggering a call treatment based on the call reputation score.

2. The non-transitory computer readable medium of claim 1, wherein the instructions further comprise performing the random simulation using a uniform random distribution and the severity value as a threshold.

3. The non-transitory computer readable medium of claim 2, wherein the call reputation score is a robocall score representing the likelihood that the telephone call is a robocall or a fraud score representing the likelihood that the telephone call is a fraudulent call.

4. The non-transitory computer readable medium of claim 1, wherein the instructions further comprise receiving an updated violator list of telephone numbers and their corresponding severity values.

5. The non-transitory computer readable medium of claim 4, wherein the instructions further comprise receiving the updated violator list of telephone numbers and their corresponding severity values at periodic intervals or in response to external call traffic events.

6. The non-transitory computer readable medium of claim 4, wherein at least one of: the telephone numbers or the severity values of the updated violator list are different from the telephone numbers and severity values of the violator list.

7. The non-transitory computer readable medium of claim 1, wherein the instructions further comprise determining the severity value associated with the telephone number is zero in response to the telephone number being absent from the violator list.

8. The non-transitory computer readable medium of claim 1, wherein the instructions further comprise obtaining the severity value associated with the telephone number in response to the telephone number being present on the violator list.

9. The non-transitory computer readable medium of claim 1, wherein the instructions further comprise inputting a model feature into the model to determine the call reputation score.

10. The non-transitory computer readable medium of claim 1, wherein the instructions further comprise transmitting the call reputation score to the call processing entity.

11. A method for call traffic anomaly mitigation, comprising:
receiving a scoring request including a telephone number associated with a telephone call at a scoring device from a call processing entity;
receiving a violator list including telephone numbers and their corresponding severity values at the scoring device from an anomaly analyzer device;
determining a severity value associated with the telephone number by performing a lookup operation in the violator list;
performing a random simulation, by the scoring device, using the severity value interpreted as a probability, as an input to determine an indicator value;
the scoring device inputting the indicator value into a model derived from historical data to determine a call reputation score;
transmitting the call reputation score to the call processing entity;
comparing the call reputation score to a call reputation score threshold at the call processing entity; and
triggering a call treatment based on the call reputation score at the call processing entity.

12. The method of claim 11, further comprising normally routing the telephone call in response to the call reputation score being equal to or less than the call reputation score threshold.

13. The method of claim 12, further comprising querying a subscriber to determine whether the telephone number is an undesired call in response to normally routing the telephone call.

14. The method of claim 11, further comprising modifying routing of the telephone call in response to the call reputation score being greater than the call reputation score threshold.

15. The method of claim 14, wherein the instructions further comprise modifying the routing of the telephone call by blocking the telephone call.

16. The method of claim 14, wherein the instructions further comprise modifying the routing of the telephone call by modifying a display name.

17. The method of claim 14, wherein the instructions further comprise modifying the routing of the telephone call by routing the telephone call to voicemail.

18. The method of claim 14, wherein the instructions further comprise modifying the routing of the telephone call by playing a voice challenge.

19. The method of claim 14, wherein the instructions further comprise modifying the routing of the telephone call by routing the telephone call to an announcement server.

20. A device for call traffic anomaly mitigation, comprising:
a memory;
a processor coupled to the memory, wherein the processor is configured to:
receive a scoring request including call data associated with a telephone call from a call processing entity, wherein the call data includes a telephone number;
receive a violator list of telephone numbers and their corresponding severity values from an anomaly analyzer device;
determine a severity value associated with the telephone number by performing a lookup operation in the violator list;
perform a random simulation using the severity value, interpreted as a probability, as an input to determine an indicator value;
input the indicator value into a model derived from historical data to determine a call reputation score;
transmit the call reputation score to the call processing entity for call treatment; and
triggering the call treatment based on the call reputation score at the call processing entity.

* * * * *